US010032119B1

(12) United States Patent
Telfer

(10) Patent No.: US 10,032,119 B1
(45) Date of Patent: *Jul. 24, 2018

(54) ORDERING SYSTEM THAT EMPLOYS CHAINED TICKET RELEASE BITMAP BLOCK FUNCTIONS

(71) Applicant: Netronome Systems, Inc., Santa Clara, CA (US)

(72) Inventor: Christopher A. Telfer, Windber, PA (US)

(73) Assignee: Netronome Systems, Inc., Santa Clara, CA (US)

( * ) Notice: Subject to any disclaimer, the term of this patent is extended or adjusted under 35 U.S.C. 154(b) by 771 days.

This patent is subject to a terminal disclaimer.

(21) Appl. No.: 14/579,458

(22) Filed: Dec. 22, 2014

(51) Int. Cl.
*H04L 12/863* (2013.01)
*G06Q 10/02* (2012.01)
*G06F 12/06* (2006.01)

(52) U.S. Cl.
CPC .......... *G06Q 10/02* (2013.01); *G06F 12/063* (2013.01)

(58) Field of Classification Search
CPC .............................. G06Q 10/02; G06F 12/063
USPC ......................................................... 370/394
See application file for complete search history.

(56) References Cited

U.S. PATENT DOCUMENTS

| 8,775,686 | B2 | 7/2014 | Stark ................................. 710/5 |
| 9,641,448 | B1 * | 5/2017 | Telfer .................... H04L 47/624 |
| 2013/0219091 | A1 | 8/2013 | Stark et al. .................... 710/104 |
| 2013/0219103 | A1 | 8/2013 | Stark ............................ 710/317 |
| 2014/0075147 | A1 | 3/2014 | Stark et al. .................... 711/205 |

* cited by examiner

*Primary Examiner* — Mang Yeung
*Assistant Examiner* — Peter G Solinsky
(74) *Attorney, Agent, or Firm* — Imperium Patent Works LLP; T. Lester Wallace; Mark D. Marrello

(57) ABSTRACT

An ordering system receives release requests to release packets, where each packet has an associated sequence number, but the system only releases packets sequentially in accordance with the sequence numbers. The system includes a Ticket Order Release Command Dispatcher And Sequence Number Translator (TORCDSNT) and a plurality of Ticket Order Release Bitmap Blocks (TORBBs). The TORBBs are stored in one or more transactional memories. In response to receiving release requests, the TORCDSNT issues atomic ticket release commands to the transactional memory or memories, and uses the multiple TORBBs in a chained manner to implement a larger overall ticket release bitmap than could otherwise be supported by any one of the TORBBs individually. Special use of one flag bit position in each TORBB facilitates this chaining. In one example, the system is implemented in a network flow processor so that the TORBBs are maintained in transactional memories spread across the chip.

27 Claims, 13 Drawing Sheets

EXAMPLE OPERATION OF THE ORDERING SYSTEM

ONE 16-BYTE TICKET ORDER RELEASE BITMAP BLOCK

ATOMIC TICKET RELEASE COMMAND FUNCTION
OF A TRANSACTIONAL MEMORY

EXAMPLE OPERATION OF THE ORDERING SYSTEM

ME ISLAND

CLUSTER TARGET MEMORY

MU ISLAND

WRITE OPERATION

READ OPERATION

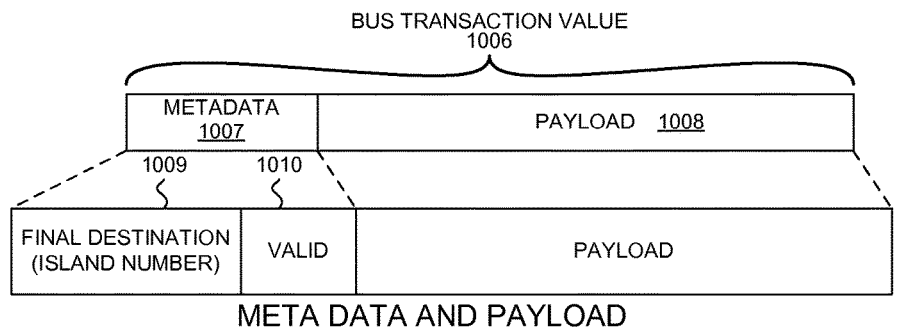

META DATA AND PAYLOAD

FIG. 11

| FIELD | WIDTH | DESCRIPTION |
|---|---|---|
| TARGET | 4 | CPP TARGET FOR THE COMMAND. |
| ACTION | 5 | ACTION RECOGNIZED BY THE CPP TARGET INDICATING WHAT SHOULD BE PERFORMED. |
| TOKEN | 2 | SUBTYPE OF ACTION RECOGNIZED BY THE CPP TARGET, INDICATING THE FLAVOR OF THE COMMAND. |
| LENGTH | 5 | LENGTH OF THE COMMAND, DEPENDENT ON THE ACTION/TOKEN, INTERPRETED BY THE CPP TARGET. |
| ADDRESS | 40 | ADDRESS THAT THE COMMAND SHOULD OPERATE ON. |
| BYTE_MASK | 8 | FURTHER OPTIONS OF A COMMAND (A BYTE MASK). |
| DATA_MASTER_ISLAND | 6 | ISLAND OF DATA MASTER. |
| DATA_MASTER | 4 | MASTER WITHIN THE ISLAND. |
| DATA_REF | 14 | PUSH-PULL ID REFERENCE INDICATING TO THE DATA MASTER WHERE TO PUSH/PULL FROM. |
| SIGNAL_MASTER | 10 | EXTENSION FOR DATA_REF AS A DATA MASTER ONLY; FOR OTHER MASTERS INDICATING WHICH MASTER WITHIN THE DATA MASTER'S ISLAND SHOULD BE SIGNALED FOR THE COMMAND. |
| SIGNAL_REF | 7 | REFERENCE WITHIN THE SIGNAL MASTER AS TO WHEN SIGNAL SHOULD BE INDICATED WITH THE COMMANDS PULL OR PUSH. |

COMMAND PAYLOAD

FIG. 12

| FIELD | WIDTH | DESCRIPTION |
|---|---|---|
| TARGET_ISLAND | 6 | ISLAND TO RETURN PULL DATA TO. |
| TARGET_PORT | 2 | IDENTIFIES THE SUB-CIRCUIT IN THE FINAL DESTINATION ISLAND THAT IS THE TARGET (OF A MULTI-TARGET ISLAND). |
| TARGET_REF | 14 | TARGET SPECIFIC REFERENCE; RETURNED WITH PULL DATA. |
| DATA_MASTER | 4 | MASTER WITHIN THE ISLAND. |
| DATA_REF | 14 | PUSH-PULL ID REFERENCE INDICATING TO THE DATA MASTER WHERE TO PUSH/PULL FROM; NORMALLY COPIED FROM THE INVOKING COMMAND. |
| SIGNAL_MASTER | 8 | EXTENSION FOR DATA_REF AS A DATA MASTER ONLY; FOR OTHER MASTERS INDICATING WHICH MASTER WITHIN THE DATA MASTER'S ISLAND SHOULD BE SIGNALED WHEN THE LAST DATA IS PULLED. |
| SIGNAL_REF | 7 | REFERENCE USABLE BY THE MASTER TO DETERMINE WHICH SIGNAL SHOULD BE INDICATED WITH THE LAST PULL DATA. |
| LENGTH | 5 | NUMBER OF 64-BIT DATA WORDS TO PULL FROM THE DATA MASTER, STARTING AT THE SPECIFIED DATA_REF. |

PULL-ID PAYLOAD

FIG. 13

| FIELD | WIDTH | DESCRIPTION |
|---|---|---|
| DATA_IS_PULL | 1 | ASSERTED FOR PULL DATA. |
| DATA_MASTER_OR_TARGET_PORT | 4 | DATA MASTER FOR PUSH DATA OR TARGET PORT FOR PULL DATA. |
| DATA_OR_TARGET_REF | 14 | DATA REF FOR PUSH DATA OR TARGET REF FOR PULL DATA. |
| SIGNAL_MASTER | 8 | ONLY USED FOR PUSH DATA; MASTER IN ISLAND TO SIGNAL IF DATA_MASTER IS NOT CTM; EXTENSION OF DATA_REF FOR DATA_MASTER OF CTM. |
| SIGNAL_REF_OR_CYCLE | 7 | SIGNAL_REF FOR PUSH DATA OR CYCLE FOR PULL DATA. |
| LAST | 1 | ASSERTED WITH THE LAST WORD OF DATA FOR PULL OR PUSH DATA. |
| DATA | 64 | 64-BITS OF PULL/PUSH DATA. |
| DATA_ERROR | 2 | ONE BIT PER 32-BITS OF DATA TO INDICATE AN UNCORRECTABLE ERROR. |
| DATA_VALID | 2 | ONE BIT PER 32-BITS OF DATA TO INDICATE, ON PUSH, THAT THE DATA IS TO BE WRITTEN TO THE DATA_MASTER. |
| NO_SPLIT | 1 | FOR PUSH DATA ONLY, ASSERTED FOR SIGNALING TO INDICATE THAT BOTH SIGNAL_REF AND SIGNAL_REF1 ARE TO BE INDICATED TO THE SIGNALED MASTER. |

DATA PAYLOAD

FIG. 14

| FIELD | WIDTH | DESCRIPTION |
| --- | --- | --- |
| DATA_IS_PULL | 1 | ASSERTED FOR PULL DATA. |
| TARGET_PORT | 2 | IDENTIFIES THE SUB-CIRCUIT IN THE FINAL DESTINATION ISLAND THAT IS THE TARGET (OF A MULTI-TARGET ISLAND). |
| TARGET_REF | 14 | TARGET SPECIFIC REFERENCE, RETURNED WITH PULL DATA. |
| CYCLE-OF_PULL | 7 | CYCLE OF PULL DATA. |
| LAST | 1 | ASSERTED WITH THE LAST WORD OF PULL DATA. |
| DATA | 64 | 64-BITS OF PULLED DATA FROM THE DATA MASTER. |
| DATA_ERROR | 2 | ONE BIT PER 32-BITS OF PULLED DATA TO INDICATE AN UNCORRECTABLE ERROR FROM THE DATA_MASTER DATA SOURCE. |

DATA PAYLOAD (FOR A PULL)

FIG. 15

| FIELD | WIDTH | DESCRIPTION |
| --- | --- | --- |
| DATA_IS_PULL | 1 | DEASSERTED FOR PUSH DATA. |
| DATA_MASTER | 4 | PUSH ID WITHIN THE ISLAND OF DATA MASTER THE DATA IS DESTINED FOR. |
| DATA_REF | 14 | REFERENCE WITHIN DATA MASTER AS TO WHERE TO PUSH FROM. |
| SIGNAL_MASTER | 8 | FOR CTM AS A DATA MASTER ONLY THIS IS AN EXTENSION FOR DATA_REF; FOR OTHER MASTERS INDICATING WHICH MASTER WITHIN THE DATA MASTER'S ISLAND SHOULD BE SIGNALED WHEN THE LAST DATA IS PUSHED. |
| SIGNAL_REF | 7 | REFERENCE WITHIN THE SIGNAL MASTER AS TO WHICH SIGNAL SHOULD BE INDICATED WITH THE LAST PUSH DATA. |
| LAST | 1 | ASSERTED WITH THE LAST WORD OF PUSH DATA. |
| DATA | 64 | 64-BITS OF PUSH DATA FROM THE DATA MASTER. |
| DATA_ERROR | 2 | ONE BIT PER 32-BITS OF PUSHED DATA TO INDICATE AN UNCORRECTABLE ERROR FROM THE DATA_MASTER DATA SOURCE. |
| DATA_VALID | 2 | ONE BIT PER 32-BITS OF DATA TO INDICATE THAT THE DATA IS TO BE WRITTEN TO THE DATA_MASTER. |
| NO_SPLIT | 1 | ASSERTED FOR SIGNALING TO INDICATE THAT BOTH SIGNAL_REF AND SIGNAL_REF1 ARE TO BE INDICATED TO THE SIGNALED MASTER. |

DATA PAYLOAD (FOR A PUSH)

FIG. 16 ial memories in prior network flow processors in general, see: 1) U.S. Pat. No. 8,775,686, entitled "Transactional Memory That Performs An Atomic Metering Command", by Gavin J. Stark, filed Aug. 29, 2012; and 2) U.S. Patent Publication Number 20140075147, having U.S. patent application Ser. No. 13/609,039, entitled "Transactional Memory That Performs An Atomic Look-Up, Add and Lock Operation", by Gavin J. Stark et al., filed Sep. 10, 2012 (the entire subject matter of these two patent documents is incorporated by reference herein).

ORDERING SYSTEM THAT EMPLOYS CHAINED TICKET RELEASE BITMAP BLOCK FUNCTIONS

TECHNICAL FIELD

The described embodiments relate generally to ordering systems that employ transactional memories, and to ticket release functions, and to related structures and methods.

BACKGROUND INFORMATION AND PRIOR ART

A type of integrated circuit referred to here as a "network flow processor" is a useful component in the design and manufacture of various types of networking equipment. For example, one particular prior art network flow processor integrated circuit has various processors and transactional memories, special processing circuitry and hardware engines, as well as ingress circuitry and egress circuitry. The transactional memories can perform several different atomic transactional memory operations, one of which is an atomic ticket release operation. To use the ticket release function of a transactional memory that has a ticket lock functionality, a processor passes the transactional memory a value in what is called an atomic "ticket release" command. This command is really a request to release. In response to receiving the ticket release command, the transactional memory compares the value carried by the command to a "next expected value" stored in a block of memory. If the value carried in the command is determined to match the next expected value stored in the block of memory, then the transactional memory outputs an indication of this. The value is said to have been "released". In addition, the transactional memory also indicates how many, if any, subsequent consecutive values were previously flagged by the transactional memory as having been previously received in other ticket release commands where the previously received values were not "released". The transactional memory outputs an indication that all such consecutive values should also be released. After outputting this information, the transactional memory updates the "next expected value" stored so that it points to the first value in the sequence of values that is not flagged. If, on the other hand, the value carried in the ticket release command is determined not to match the "next expected value" stored in the block of memory, then a bit in a bitmap maintained by the transactional memory is set to flag the fact that the out-of-sequence value was received, but that it was not released. The transactional memory is then available to process another atomic ticket release command. When the transactional memory outputs an indication of one or more consecutive values in response to a ticket release command, these values are said to have been "released". This ticket release mechanism is a general purpose mechanism provided by transactional memories on one type of prior art network flow processor. The transactional memories also provide other general purpose mechanisms. In the prior art network flow processor, packets are received onto the integrated circuit, and pass through the ingress circuitry, and are classified as belonging to one of a plurality of groups of flows. In one example, packets of each such group of flows are processed by a separate software pipeline. Packets are put into the software pipeline for processing the proper order, so the packets are then output from the software pipeline in the proper order, or in roughly the proper order. The packets of such a group of flows then pass through the egress circuitry, including the reordering hardware circuitry of the egress circuitry, and pass out of the network flow processor. For additional information on this prior art network flow processor, as well as for additional information on transaction

SUMMARY

An ordering system receives release requests to release packets, where each packet has an associated sequence number, but the system only releases a packet if it is the packet having the next sequential sequence number. Even though the ordering system may receive release requests to release packets out of order, the ordering system only releases packets in order. The ordering system is said here to "release" a packet, although the system may not actually release the packet but rather may indicate that the packet is to be released such that another entity then actually follows through and releases the packet. The ordering system includes a Ticket Order Release Command Dispatcher And Sequence Number Translator (TORCDSNT) and a plurality of Ticket Order Release Bitmap Blocks (TORBBs). The TORBBs are stored in one or more transactional memories. In response to receiving release requests, the TORCDSNT issues atomic ticket release commands to the transactional memory or memories, and uses the multiple TORBBs in a chained manner to implement a larger overall ticket release bitmap than could otherwise be supported by any one of the TORBBs individually. Special use of the flag bit in the "0" bit position in each TORBB facilitates this chaining.

In one particular operational situation, the TORCDSNT receives a single release request to release one packet having a first sequence number, and in response the TORCDSNT communicates with the transactional memory multiple times including sending more than one atomic ticket release command to the transactional memory, and the TORCDSNT then issues one or more release messages to signal the release of multiple packets, where the multiple packets are signaled for release so that they will be released in order in accordance with their first sequence numbers. This sending of the multiple atomic ticket release commands by the TORCDSNT is only in response to the receiving of the one single release request by the TORCDSNT, and is not in response to any other release request. One of the atomic ticket release commands addresses one bitmap block whereas another of the atomic ticket release commands addresses the next bitmap block. At least one first sequence number tracked by the one bitmap block is released and at least one first sequence number traced by the next bitmap block is released so that the releasing from the one bitmap block and then the next bitmap block occurs in a chained fashion in response to the one and only one release request.

In one example, the ordering system is implemented in an Island-Based Network Flow Processor integrated circuit in such a way that the TORBBs are maintained in transactional memories disposed in multiple islands that are in turn spread across the integrated circuit. From the perspective of an application layer software process executing on the IB-NFP, an instance of the ordering system is a general purpose resource that is usable by software executing on any of a set of general purpose processors of the IB-NFP. The IB-NFP may, for example, embody multiple instances of the ordering system, one for each "ordering context" handled by the IB-NFP. The novel ordering system is not just useful in such an island-based network flow processor, but rather is of general utility. The ordering system is particularly useful in multi-processor systems employing transactional memory resources with atomic ticket release functionalities.

Further details and embodiments and methods and techniques are described in the detailed description below. This summary does not purport to define the invention. The invention is defined by the claims.

BRIEF DESCRIPTION OF THE DRAWINGS

The accompanying drawings, where like numerals indicate like components, illustrate embodiments of the invention.

FIG. 11 is a diagram of a CPP bus transaction value.

FIG. 12 is a table that sets forth the various fields in a command payload of a CPP bus command.

FIG. 13 is a table that sets forth the various fields in a pull-id payload of a CPP bus transaction.

FIG. 14 is a table that sets forth the various fields in a data payload of a CPP bus transaction.

FIG. 15 is a table that sets forth the various fields of a CPP data payload in the case of a pull.

FIG. 16 is a table that sets forth the various fields of a CPP data payload in the case of a push.

DETAILED DESCRIPTION

Figure 1:
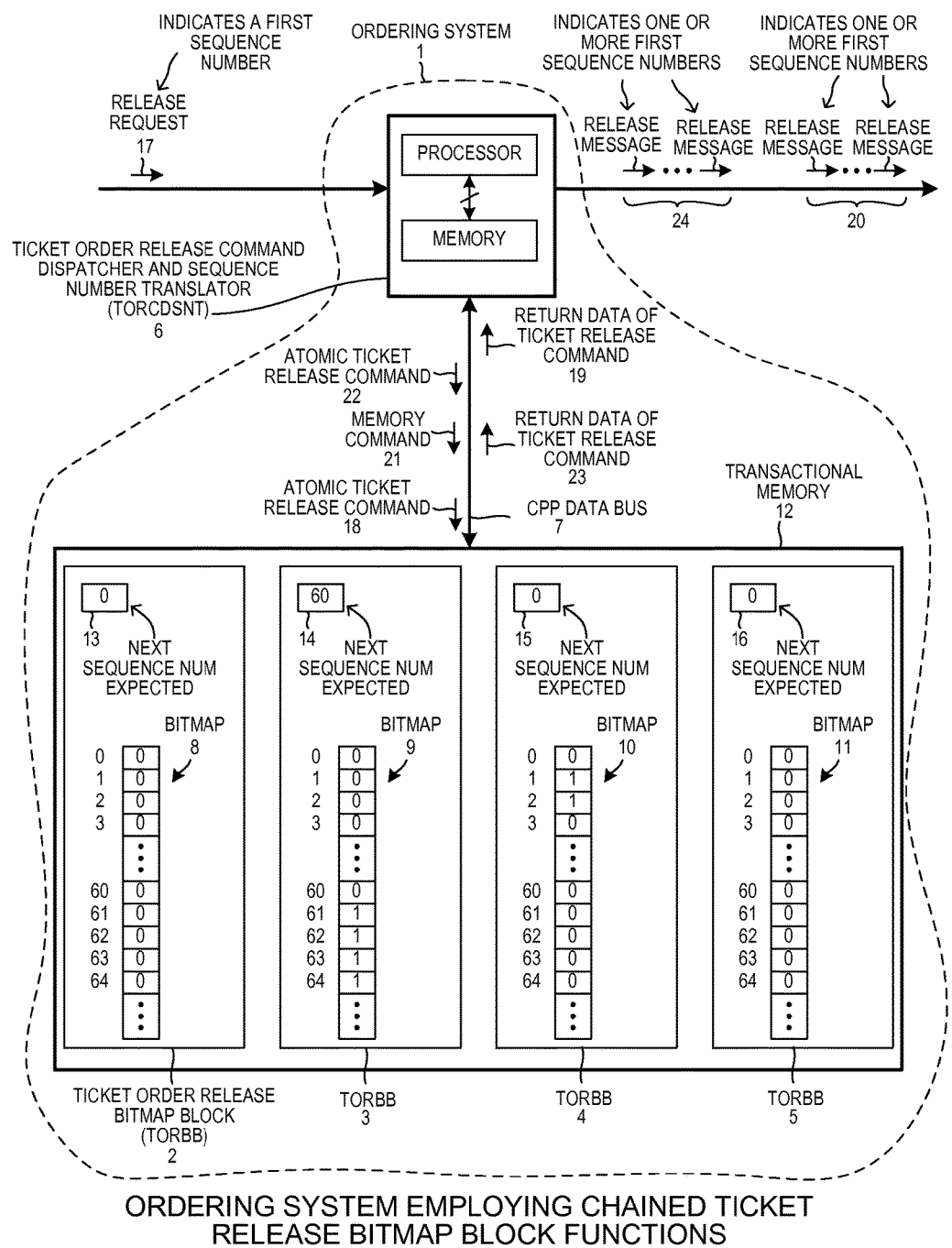
FIG. 1 is a diagram of an ordering system that employs chained ticket order release bitmap block functions in accordance with one novel aspect.

Reference will now be made in detail to background examples and some embodiments of the invention, examples of which are illustrated in the accompanying drawings. FIG. 1 is a diagram of an ordering system 1 in accordance with one novel aspect. The ordering system 1 comprises a plurality of Ticket Order Release Bitmap Blocks (TORBBs) 2-5, a Ticket Order Release Command Dispatcher and Sequence Number Translator (TORCDSNT) 6, and a bus 7. The TORBBs 2-5 together store a ticket order release bitmap. Each different one of the TORBBs stores a different part of the overall ticket order release bitmap. TORBB 2 stores its part of the bitmap in bitmap bits 8, TORBB 3 stores its part of the bitmap in bitmap bits 9, TORBB 4 stores its part of the bitmap in bitmap bits 10, and TORBB 5 stores its part of the bitmap in bitmap bits 11. In the particular example illustrated, there are four different ticket order release bitmap blocks, and these blocks are all stored in a single transactional memory 12. Transactional memory 12 is a hardware memory structure and does not include any software-executing parts.

The ordering system 1 receives "release requests", where each of these release requests includes a first sequence number. In one example, the first sequence number is a sequence number of a packet in a "ordering context", where a "ordering context" corresponds to a group of flows. Even though packets that do not correspond to the ordering context are received into the larger overall system, the release requests submitted to the ordering system 1 are only for packets of the "ordering context". As packets of the ordering context enter a network flow processor one by one, the packets of the ordering context are given sequentially increasing first sequence numbers. The assignment of first sequence numbers for the ordering context initially starts with a first sequence number of zero, and increases one by one, until the largest first sequence number for the ordering context is reached, and then the assignment of first sequence numbers loops back to zero and starts incrementing again. In the larger overall system, there may be many such ordering contexts, and for each there is a separate ordering system.

The ordering system 1 outputs "release messages", where a release message indicates that one or more packets is/are to be released. Each packet to be released is the packet that was tagged, or identified by, a first sequence number. In the description below first sequence numbers are said to be released, but it is understood that this means that a packet associated with the first sequence number is to be released.

The term released as it is used here in this specific example means submitted to egress circuitry for outputting from the network flow processor. In one particular example, the egress circuitry can cause packets to be output from the network flow processor via a network output port. In another particular example, the egress circuitry can cause packets to be output from the network flow processor via a PCIe bus interface. In other particular examples, the egress circuitry can cause packets to be output from the network flow processor via other interface circuitry.

The ordering system 1 outputs release messages so that the first sequence numbers that are released by the system, as indicated by the release messages, are always released in sequential order. In one example, the first sequence numbers are 16-bit numbers, but the actual values of the first sequence numbers all fall in a range of from 0 (decimal) to 255 (decimal). Only the lower eight bits of the 16-bit first sequence number are considered significant for purposes of the ordering system. The ordering system 1 therefore releases first sequence numbers in numerical sequence from 0 to 255, and then starts over releasing first sequence numbers from 0 again.

The overall ticket order release bitmap has a flag bit for each of the possible first sequence numbers that the ordering system could receive via a release request. The overall ordering system also has or maintains an overall "next first sequence number expected value". This "next first sequence number expected value" is updated by the ordering system such that first sequence numbers smaller than the "next first sequence number expected value" are first sequence numbers that were previously "released" by the system, but such that the "next first sequence number expected value" identifies or points to the first "first sequence number" in the stream of incoming first sequence numbers that has not been received in a release request. If an out-of-order first sequence number is received in a release request that is not the "next first sequence number expected value" but is nevertheless in the 0 to 255 range of sequence numbers tracked by the ordering system 1, then the ordering system 1 flags that a release request has been received for this first sequence number but that it could not be released (due to the fact that a release requests had not yet been received for the first sequence number identified by the "next first sequence number expected value" sequence number). After flagging that release request for the out-of-sequence first sequence number was received, the ordering system does not update or change the value of the "next first sequence number expected" because no release request for that first sequence number has yet been received.

When releasing first sequence numbers, the ordering system 1 releases the first sequence number identified by the "next first sequence number expected value", and also releases any and all of the following consecutive "first sequence numbers" whose corresponding flag bits in the overall bitmap have been previously set. If, for example, a request to release the sequence number SN1 equal to the "next first sequence number expected value" is received at a time when the bits in the bitmap associated with the next two first sequence numbers SN2 and SN3 were set, and when the bit in the bitmap associated with the next first sequence number SN4 was not set, then the ordering system 1 would output signal the release of three first sequence numbers SN1, SN2 and SN3, and would update to the "next first sequence number expected value" to point to the sequence number SN4. In this way, the ordering system updates the "next first sequence number expected value", and indicates the release of first sequence numbers so that the first sequence numbers are only released in sequential order. As explained in further detail below in connection with the specific example, there may be no single "next first sequence number expected value" that is stored as a single value in the system, but rather the information of the next first sequence number expected value may be stored as a combination of local "next sequence number expected" values 13, 14, 15 and 16.

Figure 2:
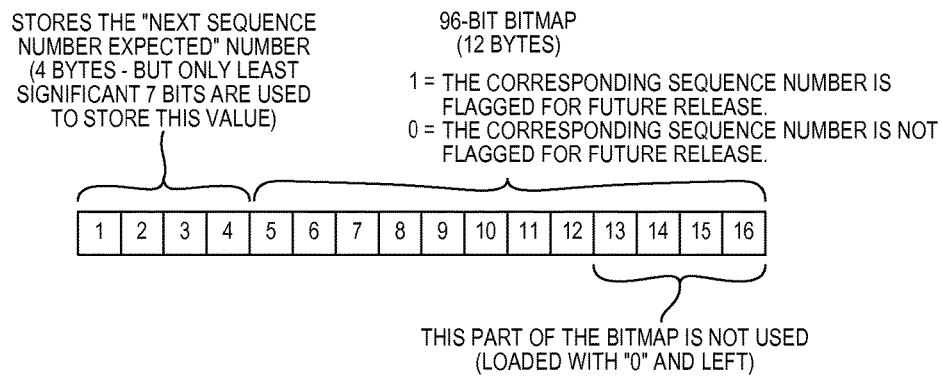
FIG. 2 is a diagram that illustrates one 16-byte Ticket Order Release Bitmap Block (TORBB) used in the ordering system of FIG. 1.

FIG. 2 is a more detailed diagram of one of the four Ticket Order Release Bitmap Blocks (TORBBs) 2-5. Each of TORBBs has the same 16-byte structure. The local "next sequence number expected" value is stored in the first four bytes of the 16-byte block. Even though four bytes are provided to store this value, only the least significant seven bits are used. All the other bits are zeros. In addition to storing a 7-bit local next sequence number expected value, the 16-byte block also stores ninety-six bits (twelve bytes) of bitmap information. Each of these flag bits corresponds to a second sequence number. In the illustration of FIG. 2, the leftmost bit of the twelve bytes corresponds to second sequence number "0000000" (0 in binary), the next leftmost bit corresponds to second sequence number "0000001" (1 in binary), the third next leftmost bit corresponds to second sequence number "0000010" (2 in binary), and so forth. The rightmost bit of the twelve bytes corresponds to second sequence number "1100000" (96 in binary). If one of these flag bits is "set" (storing a "1" value), this indicates that a request to release the corresponding sequence number has been received but that the sequence number could not be released so it was flagged pending future release. If the flag bit is "cleared" (storing a "0" value), this indicates that the corresponding sequence number is not flagged for future release. In operation, the transactional memory 12 receives an atomic "ticket release" command, and uses the values in the appropriate ticket order release bitmap block to perform the ticket release function specified by the command, and updates the values stored in the bitmap block as appropriate.

Figure 3:
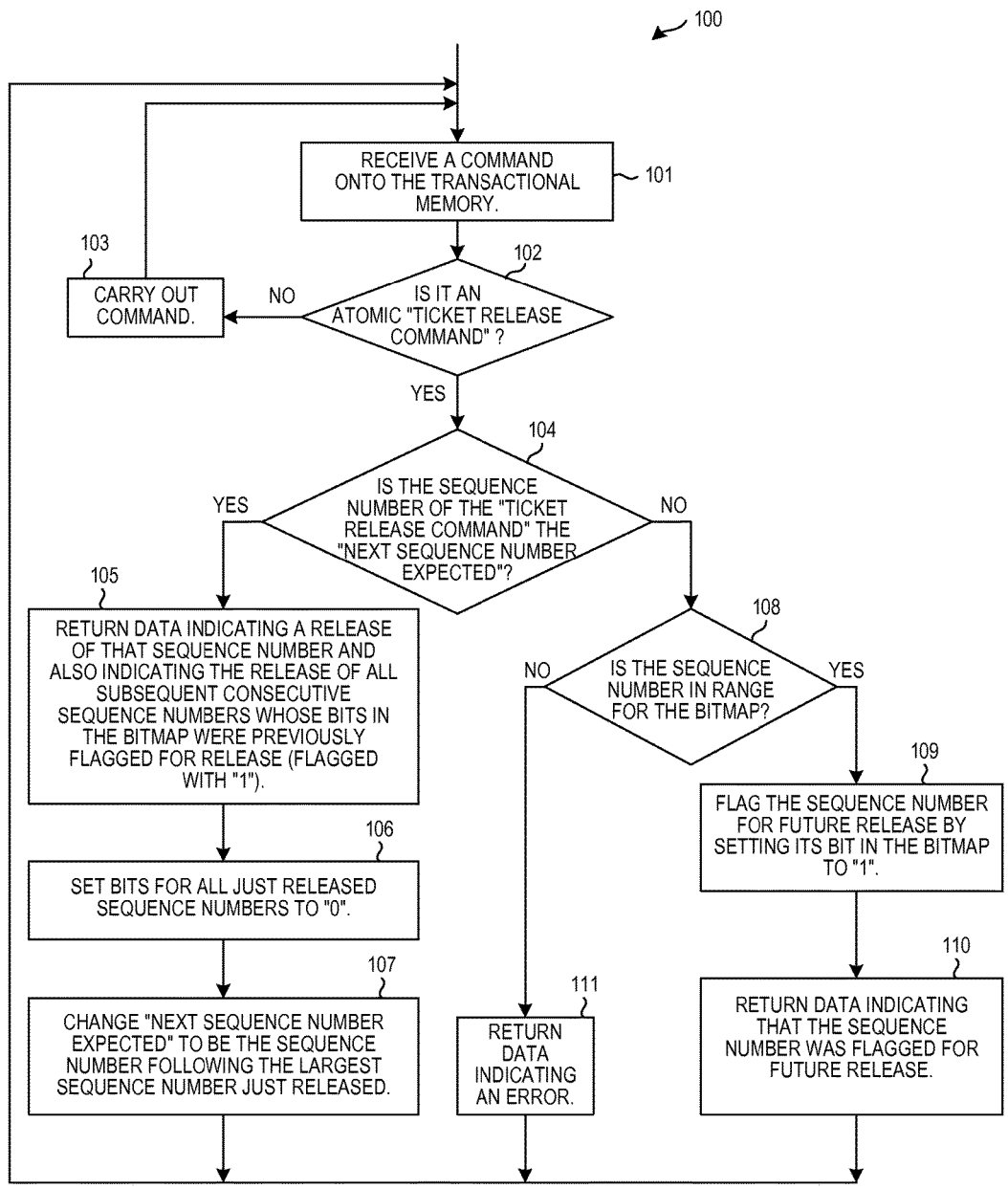
FIG. 3 is a flowchart that illustrates an operation and function of an atomic ticket release command carried out by the transactional memory of the ordering system of FIG. 1.

Before explaining the detailed operation of the ordering system 1, operation of transactional memory 12 in performing an "atomic ticket release command" is explained in connection the method 100 set forth in FIG. 3. A command is received (step 101) onto the transactional memory. If the command is not an atomic ticket release command (step 102), then the transactional memory carries out the operation specified by the command (step 103). If the command is an atomic ticket release command (step 102), then the transactional memory checks the 7-bit sequence number carried by the atomic ticket release command to determine if it matches the 7-bit local "next sequence number expected" value in the appropriate bitmap block. The transactional memory handles atomic ticket release commands for each of the four ticket release bitmaps blocks. Another field in the atomic ticket release command is an address, and this address identifies the starting address of a particular one of the four ticket release bitmaps. From this address, the transactional memory identifies the proper bitmap block to use. The "next sequence number expected" value to be used in carrying out the ticket release operation is stored in the first four bytes of this block. The ninety-six flag bits to be used in carrying out the ticket release operation are stored in the remaining twelve bytes of this block.

If the transactional memory determines (step 104) that the 7-bit sequence number carried by the atomic ticket release command matches the 7-bit local "next sequence number expected" value stored in the correct bitmap block, then (step 105) the transactional memory returns a "return data" value, where this "return data" value indicates: 1) that the sequence number that matched the "next sequence number expected" value is to be released, and 2) that any subsequent consecutive sequence numbers whose flag bits were set that are also be to released. The transactional memory changes the "next sequence number expected" value (step 107) to point to the next sequence number for which a release request has not been received and is not flagged, and clears (loads with a "0") each bit in the bitmap that corresponds to a just-released sequence number (step 106). Once this is done, the transactional memory is ready to process another atomic ticket release command.

If the transactional memory determines (step 104) that the sequence number carried by the atomic ticket release command does not match the "next sequence number expected" value of the proper bitmap block, then if the sequence number is in range for the bitmap (step 108) then the transactional memory flags the sequence number for future release (step 109) by setting (setting to "1") the corresponding flag bit in the bitmap block. The "return data" returned by the transactional memory indicates that the sequence number was flagged for future release (step 110) but does not indicate that any sequence numbers are to be released.

If the sequence number is determined (step 108) to be out of range such that there is no flag bit in the bitmap for this sequence number, then the "return data" returned by the transactional memory contains a code indicating an error condition.

In one example the transactional memory does not maintain the flag bits in the bitmap in fixed bit positions as the "next sequence number expected" is changed as described above, but rather the transactional memory operates in a manner that is more difficult to conceptualize and explain. When a release is done, the transactional memory shifts all of the stored flag bits one bit position, one bit position by one bit position at a time, until the flag bit for the first "0" flag bit has been shifted off the bitmap (or until all stored flag bits have been shifted out because no flag bit was "0"). There is always an implied "0" that is implied to be in the front of the bitmap, so after the release the first "0" that got shifted off the end of the hardware bits is the flag bit for the "next sequence number expected". The flag bit at the end of the hardware bits is for this "next sequence number expected" plus one, and the next flag bit down into the hardware bits is for the "next sequence number expected" plus two, and so forth. Accordingly, in the bitmap hardware there is not a fixed correspondence between a bit position in the bitmap hardware and a sequence number, but rather the correspondence is shifted as releases are performed. In some embodiments, the transactional memory works in this way.

In one example, the atomic ticket release command is a bus transaction value sent across the command mesh of a Command/Push/Pull (CPP) bus from the TORCDSNT 6 as a bus master to the transactional memory 12 as a bus target. In response, the transactional memory 12 returns the "return data" value across one of the data meshes of the CPP bus. The sending of the command bus transaction value to the transactional memory, and the return of the data bus transaction value back to the TORCDSNT 6 are referred to together as one CPP bus transaction. For a general description of a Command/Push/Pull bus, and for a description of the operation and structure of the CPP bus of FIG. 1 and its four meshes in particular, see: U.S. Patent Publication Number 20130219103, having U.S. patent application Ser. No. 13/399,324, entitled "Configurable Mesh Data Bus In An Island-Based Network Flow Processor", filed Feb. 17, 2012, by Gavin J. Stark (all the subject matter of which is hereby incorporated by reference). For a general description of a transactional memory that operates with a CPP bus, see: 1) U.S. Pat. No. 8,775,686, entitled "Transactional Memory That Performs An Atomic Metering Command", by Gavin J. Stark, filed Aug. 29, 2012; and 2) U.S. Patent Publication Number 20140075147, having U.S. patent application Ser. No. 13/609,039, entitled "Transactional Memory That Performs An Atomic Look-Up, Add and Lock Operation", by Gavin J. Stark et al., filed Sep. 10, 2012 (the entire subject matter of these two patent documents is hereby incorporated by reference).

Operation of the ordering system 1 of FIG. 1 is now explained in connection with the flowchart of FIG. 4. Initially, the four ticket order release bitmap blocks 2-5 are initialized so that all flag bits are cleared to zero, and so that all of the local "next sequence number expected values" 13-16 are set to be binary zero, except for the local "next sequence number expected value" 13 of the first "00" bitmap block 2 which is set to a binary one. For purposes of considering and explaining the flowchart of FIG. 4, consider the situation in which the ordering system 1 has been operating for a while. The flag bits of the various bitmaps blocks are as illustrated in FIG. 1. The local "next sequence number expected" values are as set forth in FIG. 1. The overall "next first sequence number expected value" of the overall ordering system is "01 111011". The two most significant bits "01" of this value indicate that the "01" bitmap block 3 maintains the flag bit for the overall "next first sequence number expected value". The remaining "111011" is a binary number for the decimal number 59. The bit position in the "01" bitmap block 3 corresponding to first sequence number 59, as explained in further detail below, is the flag bit position labeled "60". The "0" flag bit position in each bitmap block is reserved for a special purpose as explained below in further detail. To convert a first sequence number into a second sequence number, the two most significant bits of the 8-bit first sequence number identify one of the bitmap blocks, whereas the remaining six bits of the 8-bit first sequence number plus one is the second sequence number. This makes for a 7-bit second sequence number. Accordingly, the flag bit for the first sequence number of "01 111011" is found in the second bitmap block "01" and is found in the bit position of "60".

Figure 4:
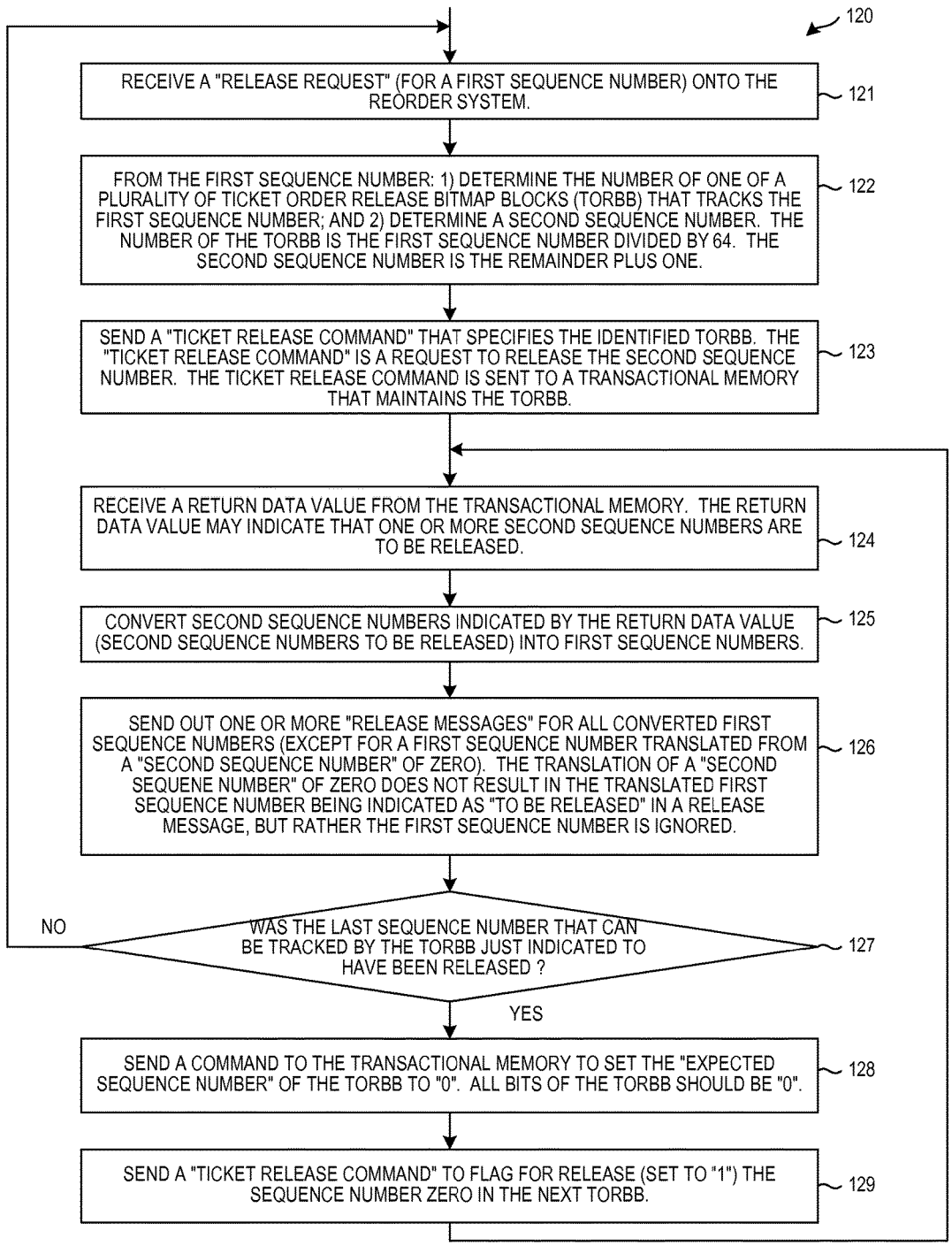
FIG. 4 is a flowchart of a method 120 of operation of the ordering system of FIG. 1.

When in this state, the ordering system 1 receives a "release request" 17 (see FIG. 4, step 121). The "release request" 17 is received onto the TORCDSNT 6. The TORCDSNT 6 determines (step 122) from the first sequence number carried by the "release request": 1) the number of the bitmap block that contains the flag bit corresponding to the first sequence number, and 2) a second sequence number that identifies the flag bit, within the bitmap block, that corresponds to the first sequence number. As described above, the number of the bitmap block is the first two bits of the 8-bit first sequence number. This is the same thing as the quotient determined by dividing the 8-bit "first sequence number" by 64. The second sequence number is the sum of the remainder of this division, and one. The remainder ranges from 0 to 63, so the second sequence numbers range from 1 to 64. In the present example, the first sequence number is the 8-bit value "01 111011" (decimal 123), so the "01" bits identify the bitmap block, and the remaining six bits "111011" (decimal 59) plus one (making seven bits) identify the flag bit "60" in this bitmap block.

Next (step 123), in response to receiving the release request 17 for a first sequence number that is in an appropriate window of first sequence numbers, the TORCDSNT 6 sends an atomic "ticket release" command 18 to the transactional memory, where the atomic ticket release command 18 is a request to release the determined second sequence number, and where the ticket release command 18 includes an address that identifies the "01" bitmap block 3.

The transactional memory 12 receives the atomic ticket release command 18, performs its ticket release function, and returns an appropriate "return data" value 19 back to the TORCDSNT 6. In the present example, the second sequence number of the command 18 matches the "next sequence number expected" value "60" stored in the "01" bitmap block 3, so the transactional memory 12 returns "return data" that indicates that second sequence number 60 (binary "0111100") is to be released. In addition, due to the fact that the flag bits for second sequence numbers "61", "62", 63" and "64" were set to "1", the "return data" 19 also indicates that these additional four sequence numbers are to be released. In one example, the way the transactional memory indicates that "60", "61", "62", "63" and "64" are to be released is by returning the number five, where the number five indicates the number of consecutive sequence numbers to be released, and where the first of these is assumed to be the sequence number of the ticket release command. The TORCDSNT 6 is the entity that sent the original ticket release command 18 to the transactional memory, so the TORCDSNT 6 can determine the first sequence numbers that are indicated by the "return data" 19.

The TORCDSNT 6 receives the "return data" 19 from the transactional memory 12, and translates the indicated second sequence numbers into first sequence numbers. The resulting first sequence number for second sequence number "60" received from the "01" bitmap block is "01 111011", the resulting first sequence number for second sequence number "61" received from the "01" bitmap block is "01 111100", the resulting first sequence number for second sequence number "62" received from the "01" bitmap block is "01 111101", and so forth.

The TORCDSNT 6 sends out one or more "release messages" 20 to indicate that each and every one of these first sequence numbers is to be released. In one example, a separate release message is output for each first sequence number to be released, where the release message includes the first sequence number being released. In another example, the TORCDSNT 6 outputs a release message that simply includes the number of first sequence numbers to be released, and the recipient of the release message is assumed to know the next first sequence number to be released that corresponds to the first of the sequence number indicated to be released by the message. In another example, the TORCDSNT 6 outputs one release message that includes the first sequence number being released, and also includes a number indicating a number of consecutive sequence numbers (starting with the first sequence number indicated) that are also being released. The TORCDSNT 6 can indicate the first sequence numbers to be released in any suitable release message or messages.

The TORCDSNT 6 monitors the first sequence numbers that were just released, and determines that the largest second sequence number that can be tracked by the "01" bitmap block has just been released (step 127). This largest second sequence number in the example of FIG. 1 is "64". Even though each bitmap block contains ninety-six flag bits, in one novel aspect each bitmap block is only used to track sixty-four sequence numbers. This simplifies the operation of the TORCDSNT 6 in translating sequence numbers.

If this "largest sequence number that can be tracked" was not released, then processing returns to step 121. In this case, the current bitmap block 3 continues to track the next sequence number expected.

If, however, the "largest sequence number that can be tracked" was just released, then processing proceeds to step 128. The TORCDSNT 6 sends a command 21 (step 128) to the transactional memory 12 to set the "next sequence number expected" value of the "01" bitmap block 3 to "0". The TORCDSNT 6 also sends (step 129) an atomic ticket release command 22 to the next "10" bitmap block 4 to set (set to "1") "0" position flag bit. At this point, in the example of FIG. 1, the "0" bit position flag bit of the "10" bitmap block contains a "1", and the following two flag bits for second sequence numbers "1" and "2" also contain "1" values. In accordance with the operation of the transactional memory, the "next sequence number expected" value stored in the "10" bitmap block 4 was "0" and an atomic ticket release command 22 was received indicating this sequence number, so the transactional memory returns "return data" 23 indicating that second sequence number corresponding to the "0" bit position is to be released. In addition, due to the next two flag bits in the "10" bitmap block 4 being set to "1", the return data also indicates that the "1" second sequence number is to be released, and that the "2" second sequence number is also to be released.

Processing proceeds from step 129 to step 124. The TORCDSNT 6 receives (step 124) the "return data" 23 from the transactional memory indicating that the first sequence numbers corresponding to second sequence numbers "0", "1" and "2" in the bitmap block 4 are to be released. The TORCDSNT 6 translates these second sequence numbers into first sequence numbers (step 125), and outputs one or more "released messages" 24 indicating that these "first sequence numbers" are being released. As mentioned above, the "0" bit position flag bit is reserved for a special purpose, and is not used to track the release status of a particular first sequence number. Accordingly, even if the TORCDSNT 6 receives an indication that a second sequence number of "0" is to be released, the TORCDSNT 6 ignores this and does indicate (for this "0" second sequence number) that any corresponding first sequence number should be released.

Processing proceeds to step 127. In the illustrated example, there is a "0" flag bit stored second sequence number position "64" and no sequence number corresponding to this bit position has been released yet, so processing proceeds to step 121. Handling of the release request 17 (to release first sequence number "01 111011") by the ordering system 1 is completed. As release requests are received by the ordering system and as release messages are output by the ordering system, the bitmap block that contains the flag bit corresponding to the "next first sequence number expected" moves from bitmap block to bitmap block up to the end of the last bitmap block "11", and then wraps around from bitmap block "11" back to the beginning of the first bitmap block "00", and continues looping around in this way.

In each bitmap block, the flag bit in the "0" bitmap position is used to store status indicating whether or not all prior sequence numbers (as tracked by the previous bitmap block) have been released. The flag bit in the "0" bitmap position of a bitmap block tracks a "second sequence number" from the transactional memory's perspective, but does not track any "first sequence number" from the perspective of the TORCDSNT. Rather, the flag bit in the "0" bitmap position is used for the special purpose. By shifting the flag bit positions that track the release statuses of the first sequence numbers (that are to be tracked by this bitmap block) up by one bitmap position, while still preserving the relative priorities of those flag bits, the lowest flag bit position in the bitmap block (that would otherwise have been used to track the release status of sequence number zero) is freed up for its special use. The special use of the "0" bitmap positions in the bitmap blocks allows the ticket release functionalities of multiple bitmap blocks to be chained together so that the bitmap blocks together maintain a larger global ticket release bitmap having enough flag bits to support the entire "first sequence number" sequence space.

Figure 5:
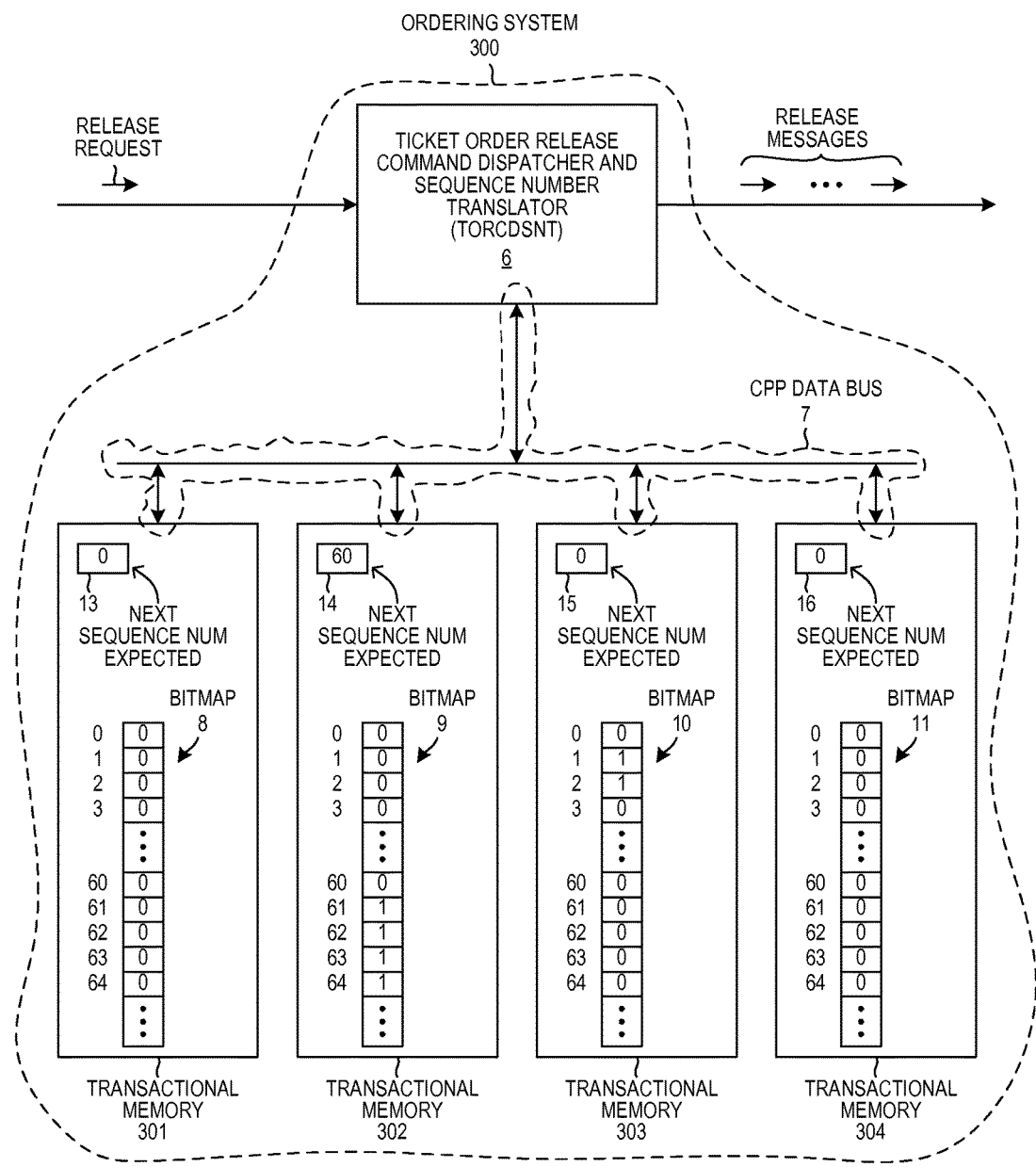
FIG. 5 is a diagram of another embodiment of the ordering system in which each TORBB is stored in a different transactional memory.

FIG. 5 is a diagram of an ordering system 300 in accordance with another embodiment. Rather than all of the bitmap blocks being stored in the same transactional memory as in the embodiment of FIG. 1, in the embodiment of FIG. 5 each bitmap block is stored in a different transactional memory. The TORCDSNT 6 is coupled to the transactional memories 301-304 via CPP data bus 7. The TORCDSNT 6 knows where each bitmap block is stored, so the TORCDSNT 6 directs its atomic ticket release commands and write commands to the appropriate one of the transactional memories 301-304 as a target. Otherwise, the ordering system 300 of FIG. 5 operates in the same way as the ordering system 100 of FIG. 1.

Figure 6:
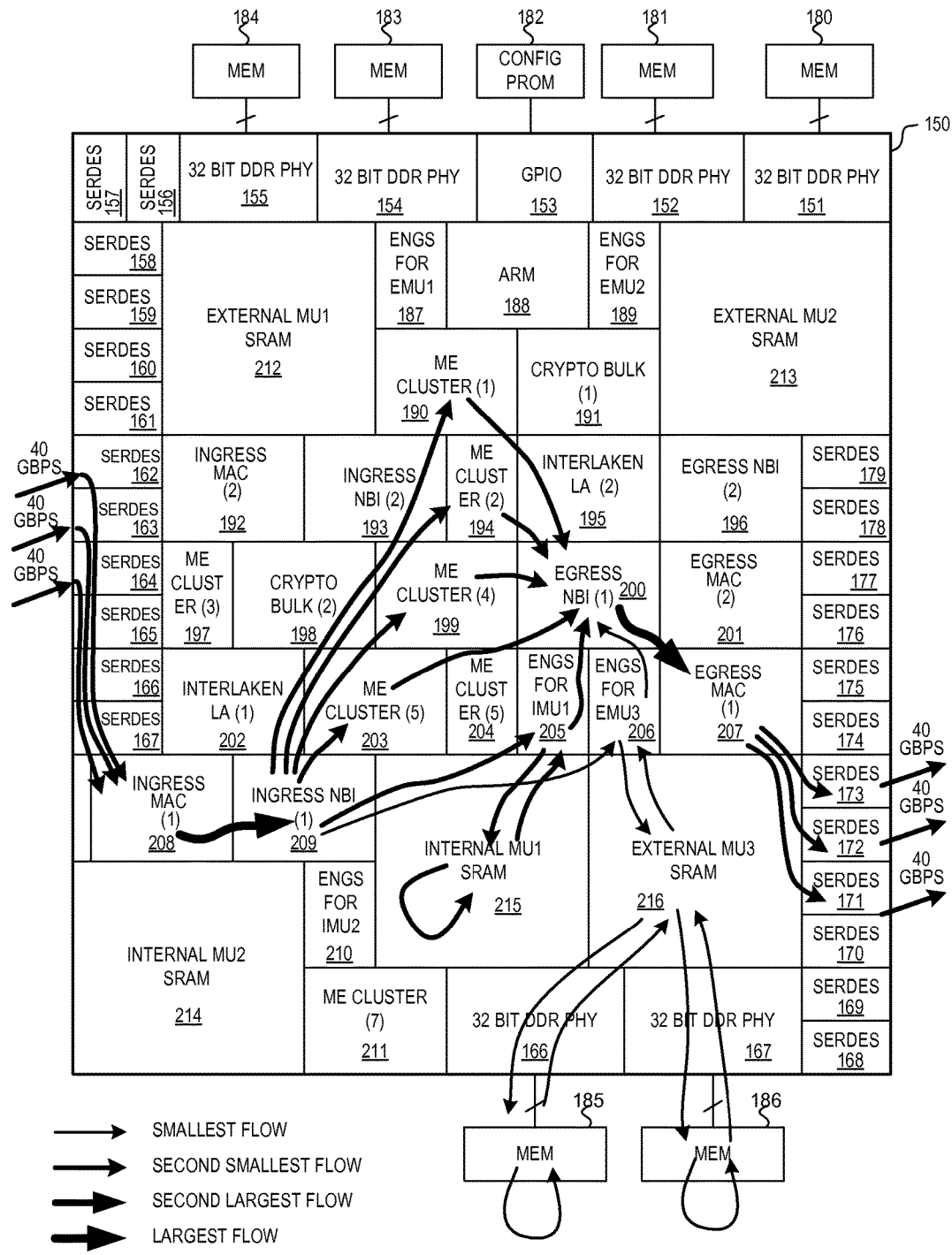
FIG. 6 is a diagram of an Island-Based Network Flow Processor (IB-NFP) integrated circuit that implements one example of the novel ordering system.

FIG. 6 is a simplified top-down diagram of an Island-Based Network Flow Processor (IB-NFP) integrated circuit, within which the novel ordering system is embodied in accordance with one novel aspect. For more detail on the IB-NFP, see: U.S. Patent Publication Number 20130219091, having U.S. patent application Ser. No. 13/399,888, entitled "Island-Based Network Flow Processor Integrated Circuit", by Gavin J. Stark et al., filed Feb. 17, 2012 (the entire contents of which is hereby incorporated by reference). The IB-NFP integrated circuit 150 includes a peripheral first area of input/output circuit blocks 151-179. Each of the SerDes I/O circuit blocks 156-167 and 168-179 is duplex in that it has four 10 Gbps lanes for receiving SerDes information and it also has four 10 Gbps lanes for transmitting SerDes information. A SerDes circuit can communicate information in both directions simultaneously. The three SerDes circuits 162-164 can therefore communicate information at 120 gigabits per second in both directions. Respective ones of the DDR physical interfaces 151, 152, 154, 155, 166 and 167 are used to communicate with corresponding external memory integrated circuits 180, 181, 183, 184, 185 and 186, respectively. GPIO interface block 153 is used to receive configuration information from external PROM 182.

In addition to the first peripheral area of I/O blocks, the IB-NFP integrated circuit 150 also includes a second tiling area of islands 187-211. Each of these islands is either a full rectangular shape, or is half the size of the full rectangular shape. For example, the island 192 is a full island. The island 197 is a half island. The functional circuits in the various islands of this second tiling area are interconnected by: 1) the configurable mesh Command/Push/Pull (CPP) data bus 7, 2) a configurable mesh control bus, and 3) a configurable mesh event bus. Each such mesh bus extends over the two-dimensional space of islands with a regular grid or "mesh" pattern. In the case of the CPP data bus 7, as described in further detail below, functional circuitry in one island can use the CPP data bus to send a command to functional circuitry in another island, to read data from functional circuitry in another island, or a write data to functional circuitry in another island.

In addition to the second tiling area, there is a third area of larger sized blocks 212-216. The mesh bus structures do not extend into or over any of these larger blocks. The functional circuitry of a larger sized block may connect by direct dedicated connections to an interface island within the tiling area and through this interface island achieve connectivity to the mesh buses and other islands.

In the operation illustrated in FIG. 6, packet traffic is received into three SerDes input/output circuit blocks 162-164. The packet data in this particular example passes through dedicated connections from three SerDes circuit blocks 162-164 to the ingress MAC island 208 and then to the ingress NBI (Network Bus Interface) island 209. A picoengine pool with the NBI island 209 performs a hash function on the incoming packets, and classifies the packets into groups of flows. Such a group of flows is referred to here as an "ordering context". Packets belonging to a given "ordering context", when exiting the IB-NFP, should exit in the same order that they entered the IB-NFP, even though individual packets of a given "ordering context" may be processed by different worker processors, referred to as "microengines". From the ingress NBI island, packets are spread out to be processed by various worker microengines (MEs) disposed in various ME islands 203, 199, 194 and 190. For each packet, the payload portion of the packet is generally stored either in internal SRAM block 215, or in external DRAMs 185 and 186. The header portion of the packet is passed to the worker microengine via a packet engine (the packet engine may, for example, be located in the CTM of the ME island containing one of the worker microengines), and the worker microengine then uses the header portion to process the packet.

When a worker microengine completes its processing of a packet, it sends a release request to an instance of the novel ordering system described above. The TORCDSNT of the ordering system in the present example is realized in the form of a software process executing on another one of the microengines. In a first example, the TORBBs 2-5 are disposed in the same Cluster Target Memory (CTM) in the same ME island where the microengine that implements the TORCDSNT is located. In a second example, the TORBBs 2-5 are spread about the integrated circuit in various transactional memories located in various islands, for example TORBB 2 is located in the cluster target memory in ME island 203, and TORBB 3 is located in the cluster target memory in ME island 199, and TORBB 4 is located in the cluster target memory in ME island 194, and TORBB 5 is located in the cluster target memory in ME island 190. Regardless of where the TORBBs of an ordering system are located, there is one such ordering system for each "ordering context" group of packet flows. The TORCDSNTs of these ordering systems can be implemented as different software processes executing on the same one microengine.

The flow of packets in the illustrated example coalesces into egress NBI island 200. The egress NBI island 200 performs packet modification, and the resulting modified packets are then passed from egress NBI island 200 and to egress MAC island 207. Egress MAC island 207 buffers the packets, and converts them into symbols. The symbols are then delivered by dedicated conductors from the egress MAC island 207 to three SerDes circuits 171-173 and out of the IB-NFP integrated circuit 150.

Figure 7:
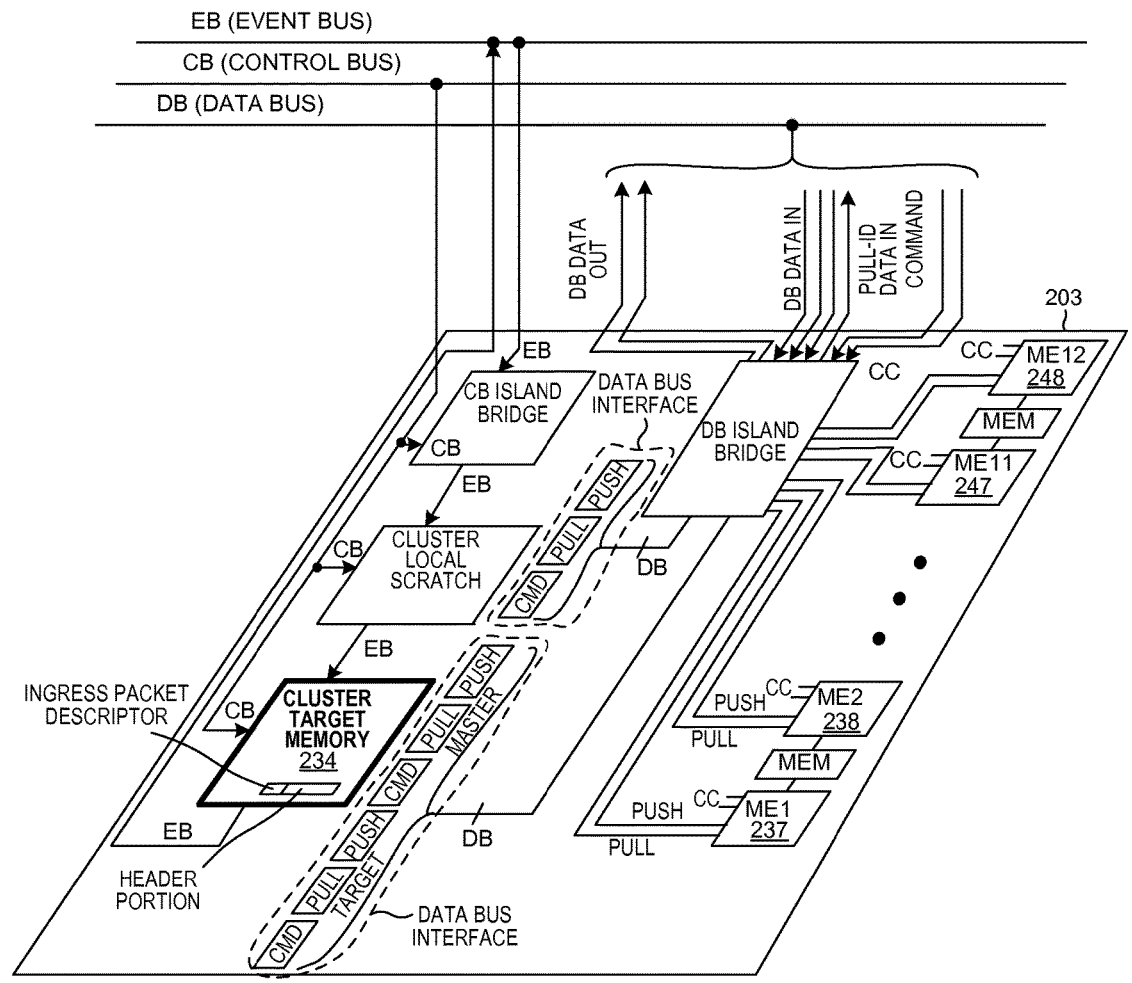
FIG. 7 is a diagram of an ME island in the IB-NFP integrated circuit of FIG. 6.

FIG. 7 is a more detailed diagram of one of the ME islands 203. The ME island includes, among other things, twelve microengines 237-248 and a Cluster Target Memory (CTM) 234. Each pair of microengines accesses instruction code from a common memory disposed between them. The cluster target memory 234 is a transactional memory that has an atomic ticket release functionality. This transactional memory is one example of a transactional memory that can store one or more TORBBs.

Figure 8:
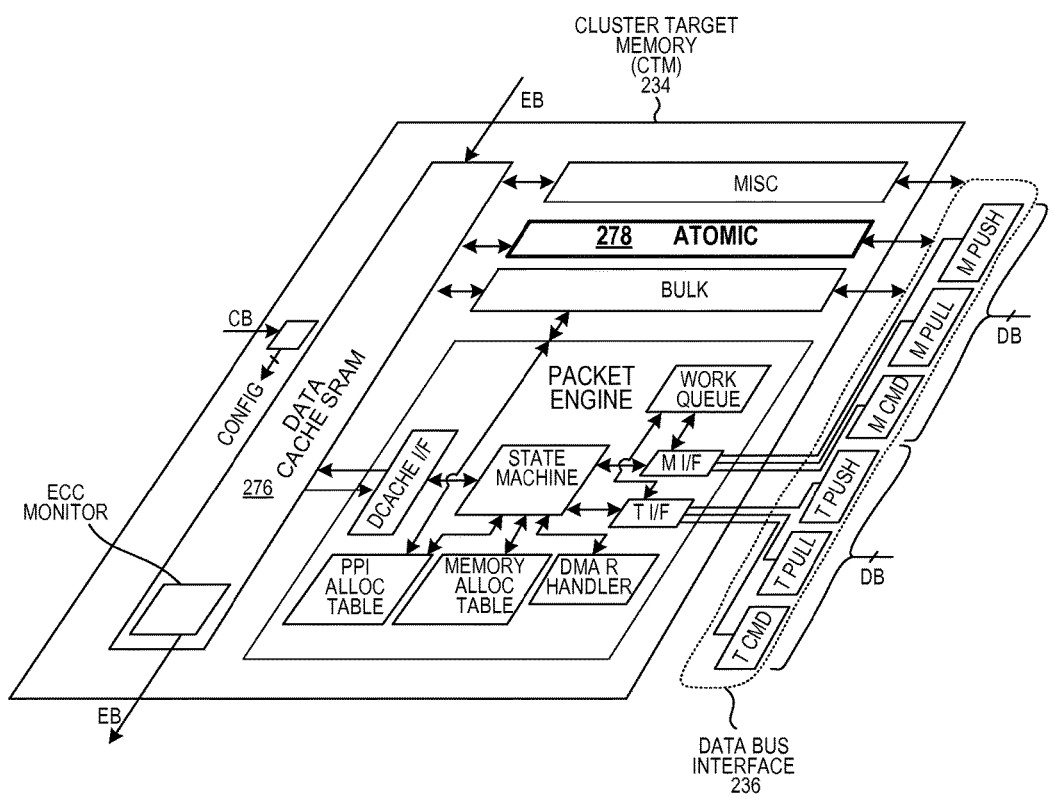
FIG. 8 is a diagram of the CTM (Cluster Target Memory) in the ME island of FIG. 7.

FIG. 8 is a more detailed diagram of the cluster target memory 234 within the ME island of FIG. 7. The cluster target memory includes, among other things, a CPP data bus interface 236, an atomic engine 278, and data cache SRAM 276. Any ordering system bitmap blocks stored in this CTM are stored in the data cache SRAM 276.

Figure 9:
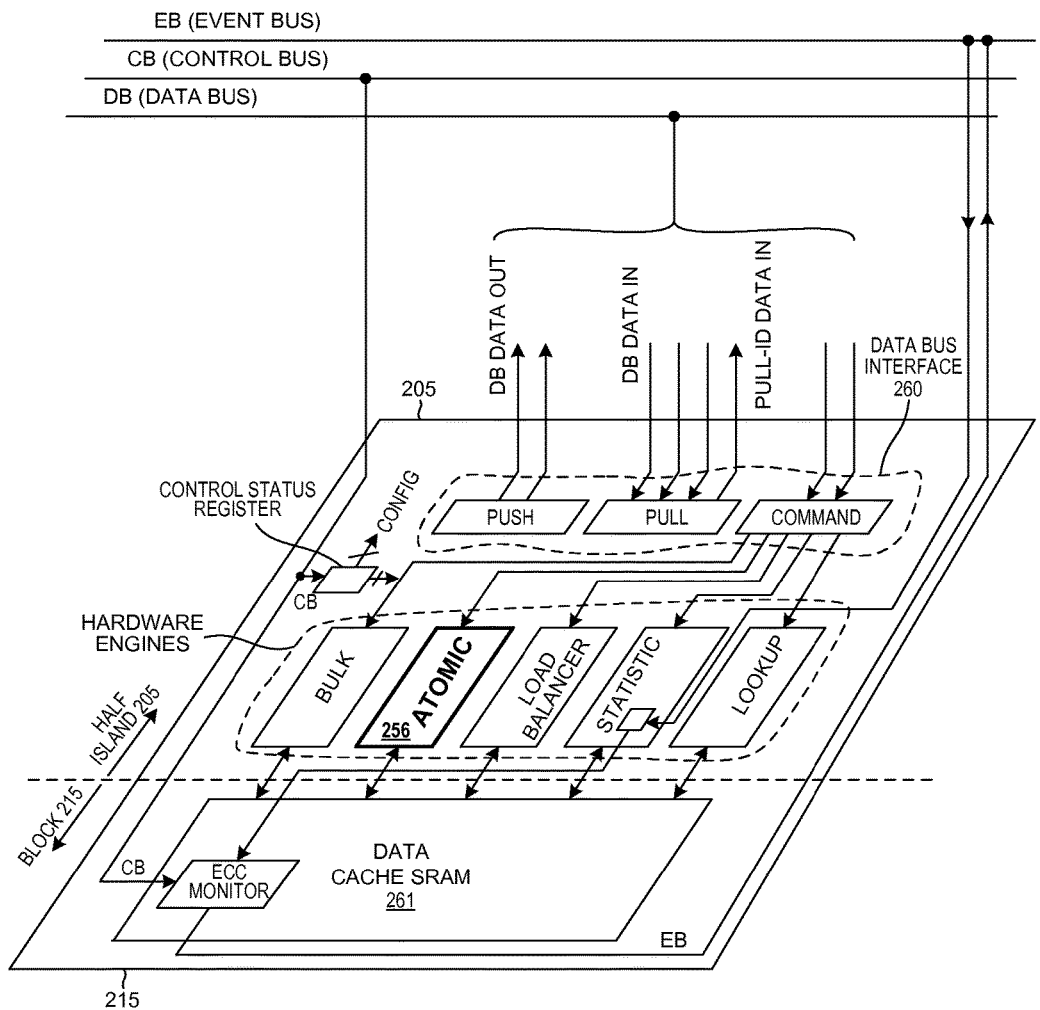
FIG. 9 is a diagram of an MU (Memory Unit) island in the IB-NFP integrated circuit of FIG. 6.

FIG. 9 is a more detailed diagram of one of the MU islands 205 and its companion SRAM block 215. The MU island/SRAM island pair implements a transactional memory. This transactional memory is another example of a transactional memory that can store one or more TORBBs and that has an atomic ticket release functionality. The MU island/SRAM island pair includes, among other things, a CPP data bus interface 260, an atomic engine 256, and data cache SRAM 261. Any ordering system bitmap blocks stored in this island pair are stored in the data cache SRAM 261.

Figure 10:
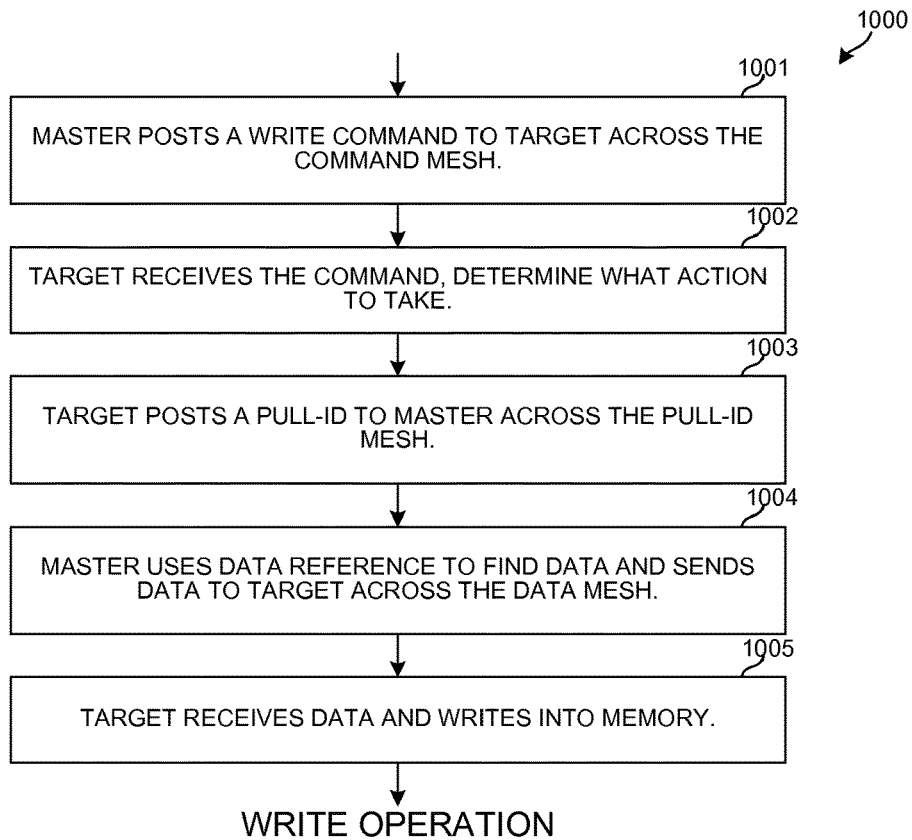
FIG. 10 is a flowchart that illustrates steps involved in a CPP write operation.

CCP Data Bus Operation: Operation of the Command/Push/Pull data bus 7 of FIG. 1 is described below in connection with FIGS. 10-17. The CPP data bus includes four "meshes": a command mesh, a pull-id mesh, and two data meshes data0 and data1. FIG. 10 is a flowchart of a write operation method 1000 that might occur across the configurable mesh CPP data bus. In a first step (step 1001), certain functional circuitry in one of the islands uses its data bus interface to output a bus transaction value onto the configurable mesh CPP data bus. This functional circuitry is referred to as the "master" of the write operation. The format of the bus transaction value is as set forth in FIG. 11. A bus transaction value 1006 includes a metadata portion 1007 and a payload portion 1008 as shown. The metadata portion 1007 includes a final destination value 1009 and a valid bit 1010.

The bus transaction value in this case is a write command to write data into functional circuitry in another island. The functional circuitry that receives the bus transaction value and the data to be written is referred to as the "target" of the write operation. The write command is said to be "posted" by the master circuit onto the command mesh. As indicated in FIG. 11, the write command includes a metadata portion and a payload portion. The metadata portion includes the 6-bit final destination value. This final destination value identifies an island by number, where the island identified is the final destination of the bus transaction value. The final destination value is used by the various crossbar switches of the command mesh to route the bus transaction value (i.e., the command) from the master circuit to the appropriate target circuit. All bus transaction values on the data bus that originate from the same island that have the same final destination value will traverse through the configurable mesh data bus along the same one path all the way to the indicated final destination island.

A final destination island may have more than one potential target circuit. The 4-bit target field of payload portion indicates which one of these targets in the destination island it is that is the target of the command. The 5-bit action field of the payload portion indicates that the command is a write. The 14-bit data reference field is a reference usable by the master circuit to determine where in the master the data is to be found. The address field indicates an address in the target where the data is to be written. The length field indicates the amount of data.

In a next step (step 1002) in the method 1000 of FIG. 10, the target circuit receives the write command from the command mesh and examines the payload portion of the write command. From the action field the target circuit determines that it is to perform a write action. To carry out this action, the target circuit writes (i.e., posts) a bus transaction value (step 1003) called a pull-id onto the pull-id mesh. The pull-id is also of the format indicated in FIG. 11. The payload portion of the pull-id is of the format set forth in FIG. 13. The final destination field of the metadata portion of the pull-id indicates the island where the master circuit is located. The target port field identifies which sub-circuit target it is within the target's island that is the target circuit of the command. The pull-id is communicated through the pull-id mesh back to the master circuit.

The master circuit receives the pull-id from the pull-id mesh and uses the content of the data reference field of the pull-id to find the data. In the overall write operation, the master circuit knows the data it is trying to write into the target circuit. The data reference value that is returned with the pull-id is used by the master circuit as a flag to match the returning pull-id with the write operation the master circuit had previously initiated.

The master circuit responds by sending (step 1004) the identified data to the target across one of the data meshes data0 or data1 as a "pull" data bus transaction value. The term "pull" means that the data of the operation passes from the master to the target. The term "push" means that the data of the operation passes from the target to the master. The format of the "pull" data bus transaction value sent in this sending of data is also as indicated in FIG. 11. The format of the payload portion in the case of the payload being pull data is as set forth in FIG. 15. The first bit of the payload portion is asserted. This bit being a digital high indicates that the transaction is a data pull as opposed to a data push. The target circuit then receives (step 1005) the data pull bus transaction value across the data1 or data0 mesh. The target circuit writes the content of the data field (the data field of FIG. 15) of the pull data payload portion into target memory at the appropriate location indicated by the address field of the original write command.

Figure 17:
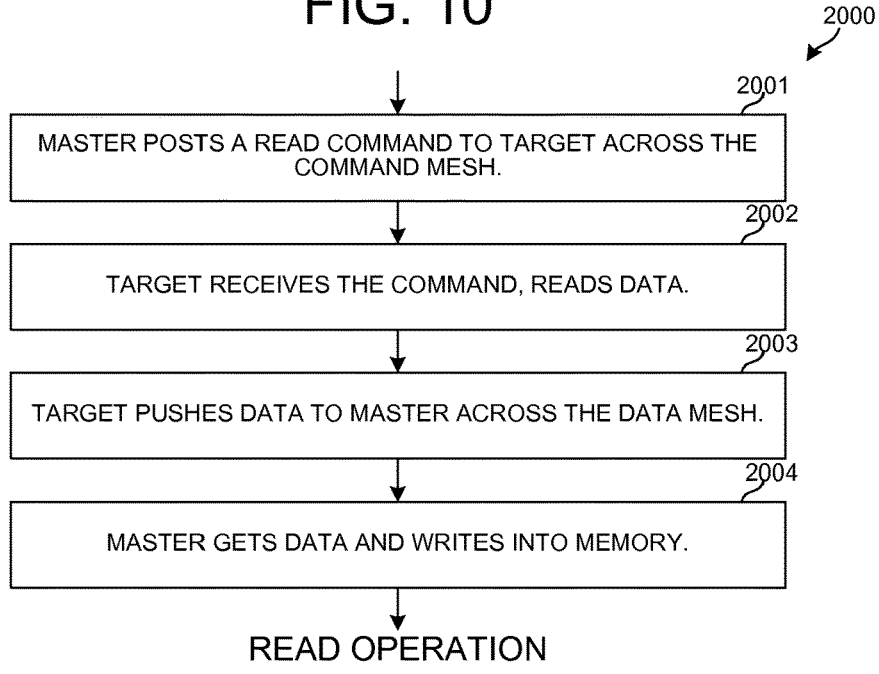
FIG. 17 is a flowchart that illustrates steps involved in a CPP read operation.

FIG. 17 is a flowchart of a read operation method 2000 that might occur across the configurable mesh CPP data bus. In a first step (step 2001), a master circuit in one of the islands uses its data bus interface to output (to "post") a bus transaction value onto the command mesh bus of the configurable mesh CPP data bus. In this case, the bus transaction value is a read command to read data from a target circuit. The format of the read command is as set forth in FIGS. 11 and 12. The read command includes a metadata portion and a payload portion. The metadata portion includes the 6-bit final destination value that indicates the island where the target is located. The action field of the payload portion of the read command indicates that the command is a read. The 14-bit data reference field is usable by the master circuit as a flag to associated returned data with the original read operation the master circuit previously initiated. The address field in the payload portion indicates an address in the target where the data is to be obtained. The length field indicates the amount of data.

The target receives the read command (step 2002) and examines the payload portion of the command. From the action field of the command payload portion the target circuit determines that it is to perform a read action. To carry out this action, the target circuit uses the address field and the length field to obtain the data requested. The target then pushes (step 2003) the obtained data back to the master circuit across data mesh data1 or data0. To push the data, the target circuit outputs a push bus transaction value onto the data1 or data0 mesh. FIG. 16 sets forth the format of the payload portion of this push bus transaction value. The first bit of the payload portion indicates that the bus transaction value is for a data push, as opposed to a data pull. The master circuit receives the bus transaction value of the data push (step 2004) from the data mesh bus. The master circuit then uses the data reference field of the push bus transaction value to associate the incoming data with the original read command, and from the original read command determines where the pushed data (data in the date field of the push bus transaction value) should be written into the master circuit. The master circuit then writes the content of the data field of the data field into the master's memory at the appropriate location.

Each of the atomic ticket release commands 18 and 22 described above in connection with FIG. 1 is a CPP bus command. In the command bus transaction value, the 5-bit action field is "01011" and the 2-bit token field is "00". These two fields (see FIG. 21) together identify the command as an atomic ticket release command. The address that identifies the start of the particular TORBB to be used is carried in the 40-bit field of the command bus transaction value. The "result data" that is returned by the transactional memory in response to the atomic ticket release CPP command is returned in the 64-bit data field (see FIG. 14) of a data payload bus transaction value. As in an ordinary CPP bus transaction, the data payload is returned on one of the data meshes of the CPP data bus. The TORCHSNT is the CPP bus master for this bus transaction, and the transactional memory is the CPP bus target for this bus transaction.

The memory command 21 described above in connection with FIG. 1 is an ordinary CPP bus write command.

Although certain specific embodiments are described above for instructional purposes, the teachings of this patent document have general applicability and are not limited to the specific embodiments described above. The TORCDSNT 6 of the ordering system 1 can be implemented in various different ways such as: 1) as a processor and a memory where the memory stores instructions executed by the processor, 2) as a software process executing on a processor, 3) as a combination of software and hardware, or 4) as an amount of dedicated combinatorial and sequential hardware logic that does not execute any instructions. In the case of dedicated combinatorial and sequential hardware logic, the TORCDSNT can be designed by specifying the above-described functions of the TORCDSNT in a hardware description language (such as CDL, or Verilog, or VHDL), and then supplying that hardware description language code into a commercially available hardware synthesizer program such that the program then outputs layout data for making a hardware circuit that performs the specified functions. A release request can be communicated to the TORCDSNT, and a release message can be communicated from the TORCDSNT in any suitable manner such as: 1) across the CPP data bus, 2) as a function call or other communication between different software processes, 3) across a bus other than the CPP data bus. The release requests and release messages can be communicated via the same, or different, buses or communication mechanisms. The ordering system can be implemented as a general purpose ordering resource that is usable by various processors in a multi-processor system. Although the ordering system can be implemented such that each ordering system has one and only one TORCDSNT, in other examples TORCDSNT functionality is made part of the application code executing on the worker MEs, such that each worker ME has one TORCDSNT, and such that this TORCDSNT handles interacting with a number of sets of bitmap blocks, where each set of bitmap blocks is for a different ordering context. Despite the special use of "0" flag bit position in each bitmap block, multiple different TORCDSNTs can access the same set of hardware managed bitmap blocks (for one ordering context) without contention errors. Accordingly, various modifications, adaptations, and combinations of various features of the described embodiments can be practiced without departing from the scope of the invention as set forth in the claims.

What is claimed is:

1. An ordering system comprising:
   a plurality of ticket order release bitmap blocks that together store a ticket order release bitmap, wherein each Ticket Order Release Bitmap Block (TORBB) stores a different part of the ticket order release bitmap, wherein the ticket order release bitmap has a next first sequence number expected value;
   a bus; and
   a Ticket Order Release Command Dispatcher and Sequence Number Translator (TORCDSNT) processing circuitry that: 1) receives a release request onto the ordering system, wherein the release request includes a first sequence number, 2) identifies, in response to the receiving of the release request, a selected one of the TORBBs and determines a second sequence number, 3) sends an atomic ticket release command via the bus to a transactional memory that maintains the selected TORBB, wherein the atomic ticket release command identifies the selected TORBB and includes the second sequence number, 4) receives back from the transactional memory a return data value, wherein in determination that the first sequence number is the next first sequence number expected value the return data value indicates one or more consecutive second sequence numbers that are to be released from the ordering system, 5) translating the one or more consecutive second sequence numbers into one or more first sequence numbers, 6) outputting one or more release messages, wherein the one or more release messages indicate the one or more consecutive first sequence numbers and indicate an order of the one or more consecutive first sequence numbers.

2. The ordering system of claim 1, wherein in response to the TORCDSNT receiving the return data value the TORCDSNT: 7) sends a second atomic ticket release command via the bus to a transactional memory that maintains a next TORBB thereby causing the transactional memory to send a second return data value back to the TORCDSNT, wherein the second return data value indicates another set of one or more consecutive first sequence values that are to be released from the ordering system.

3. The ordering system of claim 1, wherein each TORBB also stores a local next sequence number expected value.

4. The ordering system of claim 3, wherein at most one of the local next sequence number expected values of the TORBBs is non-zero at a given time.

5. The ordering system of claim 1, wherein each TORBB stores a number of flag bits FB1 to FBN, wherein N is a positive integer, wherein each flag bit FB1 to FBN corresponds to a different second sequence number the release state of which is being tracked by the flag bit, wherein each TORBB further stores a flag bit FB0, and wherein a value of the flag bit FB0 indicates whether the largest sequence number tracked by another TORBB has been released.

6. The ordering system of claim 1, wherein the TORCDSNT outputs a different release message for each respective one of the one or more consecutive first sequence values.

7. The ordering system of claim 6, wherein each of the different release messages includes a first sequence number.

8. The ordering system of claim 1, wherein the TORCDSNT outputs a single release message for the one or more consecutive first sequence numbers that are indicated by the return data value to be released from the ordering system, wherein the single release message includes a number, wherein the number indicates how many consecutive first sequence numbers are to be released by the ordering system.

9. The ordering system of claim 8, wherein the single release message includes no first sequence number.

10. The ordering system of claim 8, wherein the single release message includes a first sequence number.

11. The ordering system of claim 1, wherein the ordering system tracks a release state of a number of first sequence numbers, wherein each of the TORBBs tracks a release state of a subset of the number of first sequence numbers, and wherein the plurality of TORBBs together track the release states of all of the number of first sequence numbers.

12. The ordering system of claim 1, wherein an individual one of the TORBBs stores a number of flag bits, and wherein the value of a flag bit indicates whether a corresponding first sequence number that was carried by a previously received release request is flagged by the ordering system as awaiting release from the ordering system.

13. The ordering system of claim 1, wherein all the TORBBs are stored in the same one transactional memory.

14. The ordering system of claim 1, wherein at least one of the TORBBs is stored in a first transactional memory, and wherein at least one other of the TORBBs is stored in a second transactional memory.

15. The ordering system of claim 1, wherein the ordering system is a part of an Island-Based Network Flow Processor (IB-NFP) integrated circuit, wherein the ordering system is configured to output release messages signaling an ordered release of packets belonging to a group of flows, wherein at least one of the TORBBs is stored in a first transactional memory in a first island of the IB-NFP, and wherein at least one other of the TORBBs is stored in a second transactional memory in a second island of the IB-NFP.

16. The ordering system of claim 1, wherein the TORCH-SNT is an amount of dedicated combinatorial and sequential logic hardware circuitry that does not execute any instructions.

17. The ordering system of claim 1, wherein the TORCD-SNT comprises a processor and a memory, wherein the memory stores instructions that are executed by the processor.

18. The ordering system of claim 1, wherein the TORCD-SNT is a software process executing on a processor.

19. An ordering system comprising:
a plurality of ticket order release bitmap blocks that together store a ticket order release bitmap, wherein each Ticket Order Release Bitmap Block (TORBB) stores a different part of the ticket order release bitmap;
a bus; and
means for: 1) receiving a release request onto the ordering system, wherein the release request includes a first sequence number, 2) identifying a selected one of the TORBBs and determining a second sequence number, 3) sending an atomic ticket release command via the bus to a transactional memory that maintains the selected TORBB, wherein the atomic ticket release command identifies the selected TORBB and includes the second sequence number, 4) receiving back from the transactional memory a return data value, wherein in determination that the first sequence number matches a next first sequence number expected value the return data value indicates one or more consecutive second sequence numbers that are to be released from the ordering system, 5) translating the one or more consecutive second sequence numbers into one or more first sequence numbers, 6) outputting one or more release messages, wherein the one or more release messages indicate the one or more consecutive first sequence numbers to be released and indicate an order of the one or more consecutive first sequence numbers.

20. The ordering system of claim 19, wherein the means is taken from the group consisting of: 1) a processor and a memory, wherein the memory stores instructions that are executed by the processor; and 2) an amount of dedicated combinatorial and sequential logic hardware circuitry that does not execute any instructions.

21. A method involving an ordering system, wherein the ordering system comprises at least one transactional memory and a Ticket Order Release Command Dispatcher and Sequence Number Translator (TORCDSNT), the method comprising:
(a) maintaining a ticket order release bitmap in the at least one transactional memory, wherein the ticket order release bitmap comprises a plurality of parts, wherein each part is maintained in a different one of a plurality of Ticket Order Release Bitmap Blocks (TORBBs), wherein the ticket order release bitmap has a next first sequence number expected value;
(b) receiving a release request onto the ordering system and onto the TORCDSNT, wherein the release request includes a first sequence number;
(c) using the first sequence number to identify a selected one of the TORBBs and to determine a second sequence number;
(d) outputting an atomic ticket release command to a transactional memory that stores the selected TORBB, wherein the atomic ticket release command includes the second sequence number;
(e) receiving back from the transactional memory an amount of return data, wherein the first sequence number is the next first sequence number expected value, and wherein the return data indicates one or more consecutive second sequence numbers that are to be released;
(f) translating the second sequence number into one or more consecutive first sequence numbers that are to be released; and
(g) outputting from the TORCDSNT and from the ordering system one or more release messages, wherein the one or more release messages indicate the one or more consecutive first sequence numbers that are to be released and indicate an order of the one or more consecutive first sequence numbers, wherein the first sequence numbers are N-bit sequence numbers, wherein the second sequence number is an M-bit sequence number, and wherein N is greater than M.

22. The method of claim 21, wherein in response to the release request the TORCDSNT sends multiple atomic ticket release commands addressing multiple ones of the TORBBs, and wherein first sequence numbers tracked by multiple ones of the TORBBs are indicated as to be released by the one or more release messages output in (g).

23. The method of claim 21, wherein the ordering system is a part of an Island-Based Network Flow Processor (IB-NFP) integrated circuit, wherein the IB-NFP comprises a plurality of islands, wherein at least one of the TORBBs is maintained in a first transactional memory disposed in a first of the islands, wherein at least one other of the TORBBs is maintained in a second transactional memory disposed in a second of the islands, and wherein the ordering system operates to output ordered release messages for the release of packets belonging to a group of flows.

24. A method comprising:
(a) using a plurality of Ticket Order Release Bitmap Blocks (TORBBs) to maintain a ticket order release bitmap, wherein each TORBB is used to maintain a different part of the ticket order release bitmap;
(b) receiving a release request, wherein the release request includes a first sequence number, wherein the first sequence number is an N-bit value, and wherein the first sequence number is a sequence number in a first sequence space;
(c) from the first sequence number identifying a selected one of the TORBBs and determining a second sequence number, wherein the second sequence number is an M-bit value, wherein N is greater than M, and wherein the second sequence number is a sequence number in a second sequence space that is smaller than the first sequence space;
(d) supplying an atomic ticket release command to a transactional memory that maintains the selected TORBB, wherein the atomic ticket release command includes the second sequence number, wherein the selected TORBB includes a next sequence number expected value and a plurality of flag bits;

(e) determining that the second sequence number of the atomic ticket release command matches the next sequence number expected value, wherein the determining of (e) is performed by the transactional memory;

(f) outputting from the transactional memory a return data value, wherein the return data value indicates one or more consecutive sequence numbers that are to be released, wherein the one or more consecutive sequence numbers are in the second sequence space, wherein the outputting of (f) is performed by the transactional memory;

(g) translating the one or more consecutive sequence numbers indicated by the return data value in (f) into one or more consecutive sequence numbers in the first sequence space; and (h) outputting one or more release messages, wherein the one or more release messages indicate the one or more consecutive sequence numbers in the first sequence space.

25. The method of claim 24, wherein (a) through (h) are performed by a network flow processor integrated circuit, wherein the transactional memory of (d) stores the selected TORBB.

26. The method of claim 24, wherein the release request of (b) is communicated via a bus, wherein the atomic ticket release command of (d) is communicated via the bus, and wherein the release messages of (h) are communicated via the bus.

27. The method of claim 24, wherein each TORBB includes a plurality of flag bits FB1 to FBN, wherein N is a positive integer, wherein each flag bit FB1 to FBN corresponds to a different sequence number the release state of which is being tracked by the flag bit, wherein each TORBB further includes a flag bit FB0, and wherein a value of the flag bit FB0 indicates whether the largest sequence number tracked by another TORBB has been released.

* * * * *